(12) United States Patent
Gustafsson

(10) Patent No.: US 7,487,794 B2
(45) Date of Patent: Feb. 10, 2009

(54) DEVICE FOR DETERMINING EFFECTS SUFFERED BY A FLOW-CONTROLLED GASEOUS MEDIUM

(75) Inventor: Morgan Gustafsson, Oberageri (CH)

(73) Assignee: Sundquist Metall AB, Orebro (SE)

( * ) Notice: Subject to any disclaimer, the term of this patent is extended or adjusted under 35 U.S.C. 154(b) by 139 days.

(21) Appl. No.: 10/550,732

(22) PCT Filed: Mar. 26, 2004

(86) PCT No.: PCT/SE2004/000464

§ 371 (c)(1),
(2), (4) Date: Jan. 9, 2006

(87) PCT Pub. No.: WO2004/088268

PCT Pub. Date: Oct. 14, 2004

(65) Prior Publication Data

US 2006/0231143 A1    Oct. 19, 2006

(30) Foreign Application Priority Data

Apr. 4, 2003    (SE) ................................. 03010/02

(51) Int. Cl.
*F16K 37/00* (2006.01)
(52) U.S. Cl. ...................... 137/559; 222/159
(58) Field of Classification Search ............... 137/559; 222/159

See application file for complete search history.

(56) References Cited

U.S. PATENT DOCUMENTS

| 1,959,863 | A |   | 5/1934  | Griss           |        |
|-----------|---|---|---------|-----------------|--------|
| 3,583,435 | A |   | 6/1971  | Stewart         |        |
| 3,786,671 | A | * | 1/1974  | Caron           | 73/40  |
| 3,788,127 | A | * | 1/1974  | Marsh           | 73/40  |
| 3,874,224 | A | * | 4/1975  | Smith           | 73/40  |
| 4,068,522 | A |   | 1/1978  | Poe             |        |
| 4,077,427 | A |   | 3/1978  | Rosan et al.    |        |
| 4,197,097 | A | * | 4/1980  | Magorien et al. | 96/163 |
| 5,269,171 | A | * | 12/1993 | Boyer           | 73/40.5 R |
| 5,392,636 | A | * | 2/1995  | Blackwell       | 73/40  |
| 6,658,920 | B2| * | 12/2003 | Abbel           | 73/40  |

FOREIGN PATENT DOCUMENTS

WO  PCT/SE2004/000464    6/2004

* cited by examiner

*Primary Examiner*—Dimitry Suhol
*Assistant Examiner*—Craig M Schneider
(74) *Attorney, Agent, or Firm*—Pequignot + Myers LLC

(57) ABSTRACT

Liquefied petroleum gas is widely used in leisure time activities. Here, as liquefied petroleum gas is highly inflammable, it is important to have an indicator (19) that quickly determines whether there is leakage. The present invention relates to a new leak indicator (19) that, when an easily operated button (20) is pushed downwards into a cavity (8), indicates whether or not there is leakage. The space confined in the cavity (8) is completely closed off when the appertaining liquefied petroleum gas system is in normal operation mode.

9 Claims, 1 Drawing Sheet

DEVICE FOR DETERMINING EFFECTS SUFFERED BY A FLOW-CONTROLLED GASEOUS MEDIUM

Figure 1:
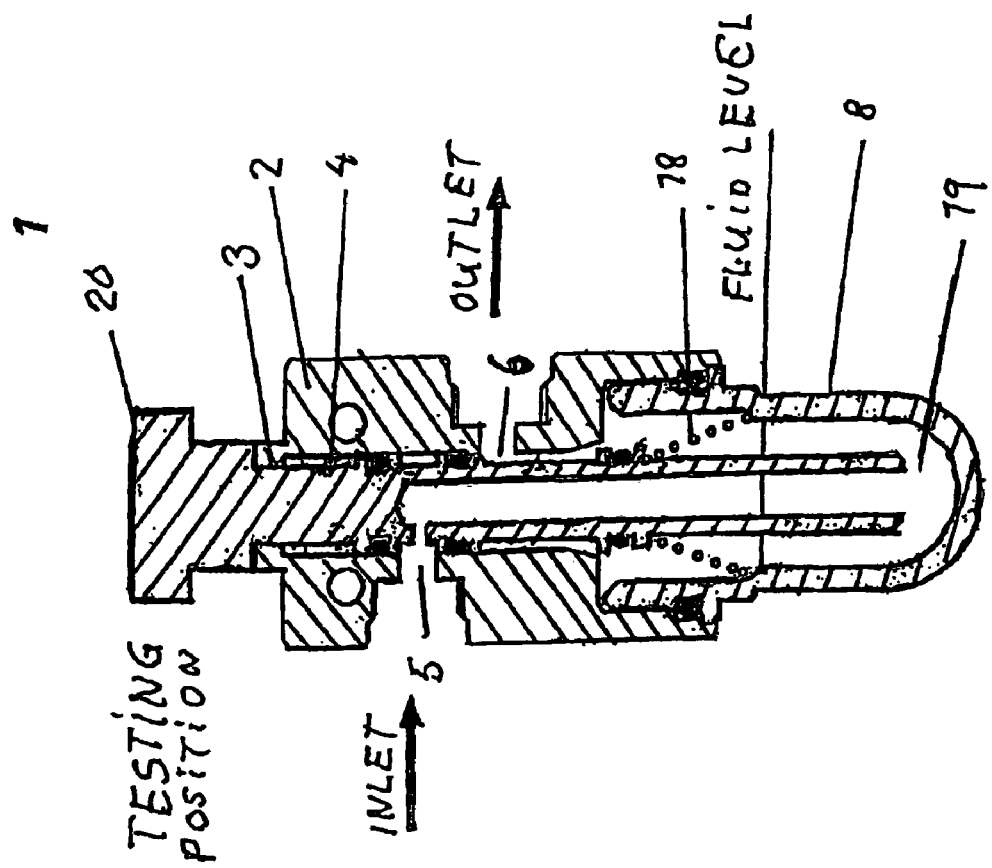

The present invention is based on a device for determining the effects suffered by a flow-controlled gaseous medium. An explanatory instance of this is a gaseous medium carried in pipes from a supply point to various consumption points. At these latter points, there is usually a desire to check that the medium has not suffered any undesirable effects. The flow may have been affected by leakage, in which case, air bubbles will have become trapped in the medium. This can be determined by having the medium flow through a fluid, which will disclose the presence of air bubbles. The gaseous medium may also have picked up undesirable substances. Once again, the medium can be passed through an indicator, such as a fluid, that will, for example, change color if undesirable substances are present. There are many possible variations. The most suitable way of determining whether a gaseous medium has suffered an undesirable effect is to have the controlled flow pass through a device where, by switching from operation mode to test mode, it can be determined whether the medium has been exposed to extraneous influences.

There are already such devices on the market but, as is not uncommon, these have certain disadvantages.

The present invention is designed to present a new device that has taken into account the disadvantages of the already available devices. In one known device to determine any effects, a control (actuator) can be switched between two positions. In one of these positions, the gaseous medium passes directly through the device. In the other, it passes through an indicator, which may be a fluid. When it is necessary to carry out a test, said actuator must be moved upwards. This is a maneuver that, in a crisis situation, works poorly and feels unnatural for any user in such a situation. Thus, in the present invention, the actuator has been so arranged that, when it is desired to obtain information regarding leakage, the actuator is pressed downwards. This is the most natural reaction of users in crisis situations. A unit with a device as per the present invention can be located in an object that can be subject to various forms of movement. In such cases, it must not be possible for the indicator to leave its confines to permit the through-flow of the gaseous medium. The invention is so constructed that, in normal operating mode, the indicator is completely closed off from the through-flow of the gaseous medium.

The invention is characterised by a housing that has a cylindrical cavity in which a cylindrical flow control body can move between an upper and a lower position. Between the inner surface of the housing that provides the cavity and the outer surface of the control body, there are three seals. These seals are fixed to, and spaced along, the outer surface of the flow control body and are in contact with the inner surface of the housing that provides the cavity. They are so placed that, in an upper position, direct free passage is provided for the gaseous medium to flow through the device while, at the same time, the compartment holding the indicator is completely closed off. In the other position (a position for testing) i.e. when the cylindrical body is in its lower position, the gaseous medium's direct free passage through the device is blocked while the flow control body creates an alternative route by opening the indicator and the lowest seal for free passage. Thus, with the flow control body in its upper position, the indicator compartment is completely closed off and the gaseous medium can only flow directly through the device. However, with the flow control body in its depressed position, the gaseous medium is forced to flow through the indicator before exiting the device.

Other characteristics of the present invention are disclosed in the following patent claims.

Figure 2:
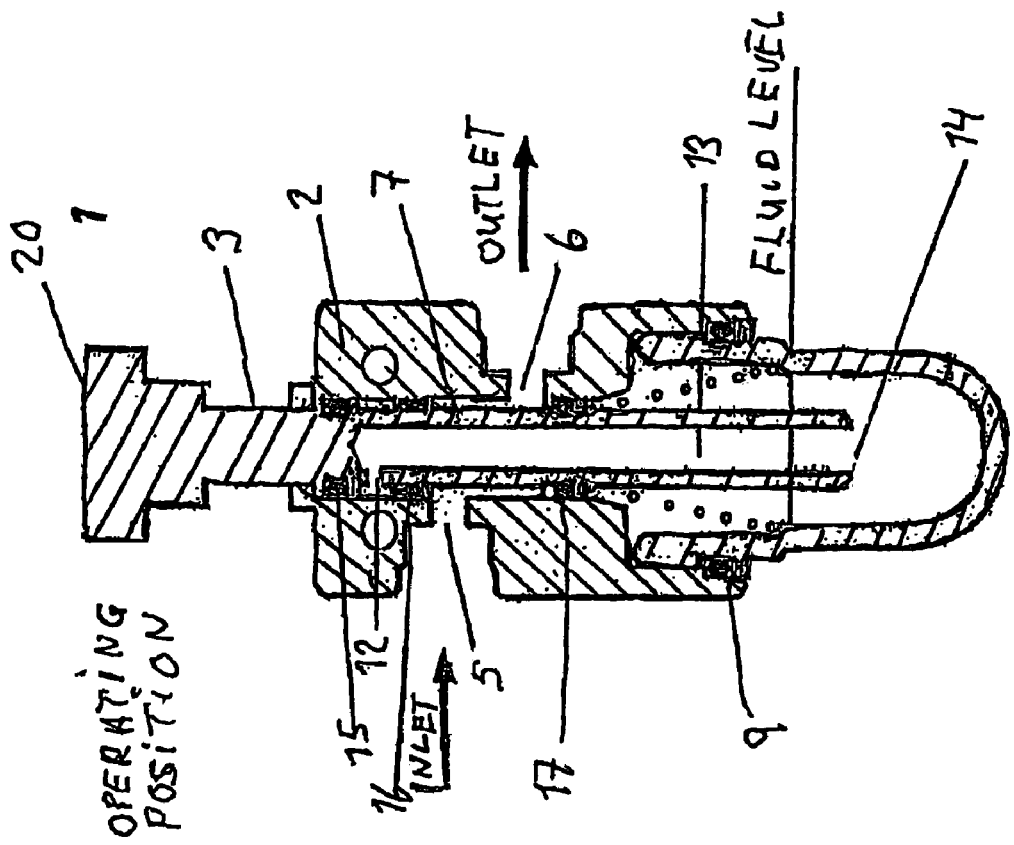

One design of the present invention is described in the explanation of the attached drawing, where:

FIG. 1 shows the device where it only permits direct free passage of a gaseous medium, and FIG. 2 shows the device set so that the gaseous medium passes through an indicator before exiting the device.

The figures show a device that, in the operating mode, permits the direct passage of a gaseous medium without said medium being subjected to any extraneous influences whatsoever. The device can also be activated so that the gaseous medium has to pass through an indicator that has the function of determining whether said medium has been exposed to any extraneous influences, e.g. leakage. Thus, a device as per both figures is used by connecting it to a conduit through which there is a flow of a gaseous medium. Connection is achieved by making a break in the conduit and connecting the ends via the inlet and the outlet of the device.

The device shown in both figures is intended for connection to a pipe forming part of a liquefied petroleum gas (LPG) system. Of course, the device is not restricted to use in LPG systems. It can be used in all cases where it is sought to determine whether a gaseous medium has suffered any effects.

The figures show the device adapted for an LPG system and serving as a leak indicator. The leak indicator is labelled 1 and comprises a housing (2) with a cylindrical flow control body (3) that can be moved upwards and downwards in a cylindrical cavity (4) in the housing (2). As the diameter of the cylindrical flow control body (3) is less than that of the cavity (4), a ring-shaped cylindrical (tubular) void is left between the cylindrical flow control body (3) and the cavity (4). This void connects to an inlet (5) for a gaseous medium that is intended to flow through the housing (2) and exit it via an outlet opening (6). In FIG. 1, part of said tubular void is labelled 7 and it can be seen how the gaseous medium flows through the tubular void (7) and then exits the housing (2) through the outlet (6). Spaced along its outer surface, the cylindrical flow control body (3) has three seals (15-17) In FIG. 1, seals 16 and 17 delimit the gas flow through the indicator (1). At its lower end, housing 2 has a further housing (8) for a fluid or other indicator medium (19). Housing 8 is joined to housing 2 via a fastening device (9). The cylindrical flow control body (3) encloses its own cylindrical cavity (13). This cavity is axially disposed, closed at its top but open at the lower end of the cylindrical flow control body (3). The open end is labelled 14. Towards its upper end, cylindrical cavity 13 has an opening (12) located between seals 15 and 16. This opening provides a direct connection to the void around the cylindrical flow control body (3). All three seals (15-17) are firmly fixed to the flow control body (3). Housing 2 has a spring (18) that, at one end, rests on seal 17 and, at the other, against a part of the housing. Through the action of this spring (18), the cylindrical flow control body (3) automatically takes up its top position. Thus, when a test reading is required, the actuator (20) must be manually pressed down. As soon as the downwards pressure is removed, the cylindrical flow control body (3) returns to its original (home) position.

In the above manner, the present invention serves as a leak indicator. When the leak indicator's actuator is pressed down, an indication is given of whether there is or is not a gas leak. That the leak indicator's actuator always takes up its topmost position in the absence of external pressure is a valuable safety feature. Owing to the design of the invention, indicator fluid can never flow into the passage for the direct through-flow of the gas, even when the invention is not in what would be considered its normal position.

In a further embodiment of the invention, the indicator medium (19) comprises a fluid and the compartment, more preferably the further housing (8), is transparent. In yet a further preferred embodiment of the invention, the fluid comprises propylene glycol.

The invention claimed is:

1. A device for determining the presence of undesirable effects of a gaseous medium, the device comprising a housing having a cylindrical cavity and a compartment capable of holding a cylindrical cavity and a compartment capable of holding an indicator medium, the device also comprising a cylindrical flow control body which is slidably moveable within the housing cavity between a first position and a second position, the flow control body comprising a first seal and a second seal fixed eternally to the flow control body, which seals form between them a void around the flow control body and in fluid contact with in inlet and an outlet of the housing, the void having first and second void parts, the flow control body also comprising a third seal fixed externally to the flow control body between the first and second seals, forming between the first seal and the third seal the first void part and forming between the third seal and the second seal the second void part, the flow control body having an inner elongated cavity with one end in fluid contact with the first void part and the other end in contact with the indicator medium when present in the device, wherein the flow control body in the first position forms a first passageway between the second and third seals for the gaseous medium comprising the inlet, the second void part and the outlet, and in the second position forms a second passageway between the first and third seals for the gaseous medium comprising the inlet, the first void part, the elongated cavity of the flow control body, the second void part and the outlet.

2. The device according to claim 1, wherein the first position of the flow control body comprises an upper position and the first passageway comprises a normal flow passage.

3. The device according to claim 1, wherein the second position of the flow control body comprises a lower position and the second passageway comprises a test flow passage by which the gaseous medium can pass through the indicator medium when present in the device.

4. The device according to claim 1, wherein the cylindrical cavity of the housing has a substantially uniform diameter through the housing.

5. The device according to claim 1, wherein the housing comprises a spring that is capable of resiliently putting the flow control body into the first position.

6. The device according to claim 1, wherein the compartment comprises a transparent housing.

7. The device according to claim 1, wherein the indicator medium comprises a fluid.

8. The device according to claim 7, wherein the fluid comprises propylene glycol.

9. A method for detecting leakage in a liquefied petroleum gas system comprising the step of causing a gaseous medium of the system to pass through a device according to claim 1.

* * * * *